United States Patent [19]

Kutsuwa et al.

[11] Patent Number: 5,310,787
[45] Date of Patent: May 10, 1994

[54] POLYESTER PACKAGING MATERIAL

[75] Inventors: Yoshikazu Kutsuwa, Ichikawa; Shigenori Ishii, Chiba; Toru Fukada, Ichihara, all of Japan

[73] Assignee: Du Pont-Mitsui Polychemicals Co., Ltd., Tokyo, Japan

[21] Appl. No.: 889,264

[22] Filed: May 28, 1992

[30] Foreign Application Priority Data

Jun. 4, 1991 [JP] Japan ................ 3-229815

[51] Int. Cl.⁵ .................................. C08L 67/02
[52] U.S. Cl. .................... 524/513; 525/166; 525/173; 525/174; 525/176
[58] Field of Search ............. 525/166, 173, 176; 524/513

[56] References Cited

U.S. PATENT DOCUMENTS

| | | | |
|---|---|---|---|
| 3,639,527 | 2/1972 | Brinkmann | 525/176 |
| 4,020,126 | 4/1977 | Gander et al. | 260/873 |
| 4,987,187 | 1/1991 | Udipi et al. | 525/851 |

FOREIGN PATENT DOCUMENTS

| | | |
|---|---|---|
| 0211649 | 2/1987 | European Pat. Off. |
| 0329468 | 8/1989 | European Pat. Off. |
| 2242435 | 3/1975 | France |
| 2-263860 | 10/1990 | Japan |
| WO89/09799 | 10/1989 | PCT Int'l Appl. |

*Primary Examiner*—Patricia A. Short
*Attorney, Agent, or Firm*—Varndell Legal Group

[57] ABSTRACT

A polyester packaging material having a layer formed from a polyester composition as a content contacting layer, wherein the polyester composition comprises 70–95 parts by weight of a polyethylene terephthalate copolymer and 5–30 parts by weight of an ethylene copolymer ionomer. The polyethylene terephthalate copolymer is derived from terephthalic acid (and isophthalic acid, if desired), ethylene glycol and cyclohexanedimethanol (a molar ratio of the ethylene glycol to the cyclohexanedimethanol being within the range of 95/5 to 75/25), and the polyethylene terephthalate copolymer has an endothermic peak of 180° to 240° C. as measured by a differential scanning calorimeter after heated at 130° C. for 5 hours in nitrogen and has an endotherm of 10 to 40 Joule/g at the endothermic peak. The polyester packaging material is excellent in various properties such as odor-keeping properties, ductile properties, heat resistance, impact resistance and heat-sealing properties, so that the polyester packaging material can be used as inner materials of paper containers, inner coating materials of cans, etc.

6 Claims, No Drawings

POLYESTER PACKAGING MATERIAL

FIELD OF THE INVENTION

The present invention relates to polyester packaging materials excellent in odor-keeping properties (i.e., scent-keeping), ductile properties, impact resistance and other properties. More particularly, the invention relates to packaging materials for packaging odorous (scented) substances specifically foods and drinks.

BACKGROUND OF THE INVENTION

Packaging materials such as hollow containers, trays, lid materials, inner layer materials of paper containers and inner coating materials of cans are brought into direct contact with foods or drinks such as juice and water. Therefore, the packaging materials are required to be excellent in gas barrier properties, odor-keeping properties, etc. As the packaging materials, polyethylene terephthalates have been paid much attention.

The inner layer materials of paper containers require high heat-sealing properties, high ductile properties and high impact resistance, and the inner coating materials of cans require high ductile properties, high impact resistance and high adhesion to the can materials. However, conventionally known polyethylene terephthalates are not always sufficient in those properties. For example, a polyethylene terephthalate homopolymer derived from terephthalic acid and ethylene glycol is insufficient in heat-sealing properties and impact resistance, and a crystalline polyethylene terephthalate copolymer composed of terephthalic acid and ethylene glycol and a small amount of a copolymerizable component other than ethylene glycol is not always excellent in the ductile properties and impact resistance. Further, an amorphous polyethylene terephthalate copolymer prepared using cyclohexanedimethanol in an amount of about 30% by mol as a diol component (commercially available under the trade name of PETG) is relatively high in the ductile properties and the impact resistance, but the level of the impact resistance is not satisfactory, and the odor-keeping properties thereof are insufficient. Moreover, the heat resistance of the amorphous polyethylene terephthalate copolymer is poor, so that a problem resides when conducting a retort treatment or a hot charging using a product of the copolymer.

The present inventors have studied to solve the above-mentioned problems in the prior art and to obtain packaging materials excellent in odor-keeping properties and also showing sufficient ductile properties and high impact resistance. As a result, they have found that a polyester composition comprising a polyethylene terephthalate copolymer having a specific composition and specific physical properties and a specific ethylene copolymer ionomer is excellent in the above-mentioned various properties, and accomplished the invention.

OBJECT OF THE INVENTION

The present invention intends to solve the above-mentioned problems in the prior art, and an object of the invention is to provide a polyester packaging material having excellent odor-keeping properties and high ductile properties and also showing high impact resistance and high heat-sealing properties.

SUMMARY OF THE INVENTION

There is provided by the present invention a polyester packaging material having a layer formed from a polyester composition as a content contacting layer (an inner layer), wherein the polyester composition comprises:

70-95 parts by weight of a polyethylene terephthalate copolymer which is derived from terephthalic acid, if desired isophthalic acid, ethylene glycol and cyclohexanedimethanol, a molar ratio of the ethylene glycol to the cyclohexanedimethanol being within the range of 95/5 to 75/25, and which has an endothermic peak of 180° to 240° C. as measured by a differential scanning calorimeter after heated at 130° C. for 5 hours in nitrogen and an endotherm of 10 to 40 Joule/g at the endothermic peak, and 5-30 parts by weight of an ethylene copolymer ionomer.

Such polyester packaging material is excellent not only in the odor-keeping properties and the ductile properties but also in the impact resistance and the heat-sealing properties.

DETAILED DESCRIPTION OF THE INVENTION

The polyester packaging material of the present invention is described below in detail.

The polyester packaging material of the invention has, as a content contacting layer, a layer formed from a polyester composition comprising a polyethylene terephthalate copolymer and an ethylene copolymer ionomer.

Polyethylene terephthalate copolymer

The present invention uses as the polyethylene terephthalate copolymer a polyethylene terephthalate copolymer derived from:

terephthalic acid, ethylene glycol and cyclohexanedimethanol, or terephthalic acid, isophthalic acid, ethylene glycol and cyclohexanedimethanol.

A molar ratio of the ethylene glycol to the cyclohexanedimethanol is in the range of 95/5 to 75/25, preferably 92/8 to 83/17.

In the case of using isophthalic acid, the amount of the isophthalic acid is not more than 10% by mol, preferably not more than 5% by mol, based on the total amounts of the carboxylic acids (i.e., terephthalic acid+isophthalic acid). When the amount of the isophthalic acid is too large, the content of the cyclohexanedimethanol should be reduced to obtain a polyethylene terephthalate copolymer having an endothermic peak of 180° to 240° C. and an endotherm of 10 to 40 Joule at the endothermic peak, and thereby the resulting polyethylene terephthalate copolymer tends to be insufficient in the ductile properties and the impact resistance.

The polyethylene terephthalate copolymer used in the invention may contain a small amount of a dicarboxylic acid other than the terephthalic acid and the isophthalic acid, such as 2,6-naphthalenedicarboxylic acid, as a dicarboxylic acid component. Further, the polyethylene terephthalate copolymer may contain a small amount of diol other than the ethylene glycol and cyclohexanedimethanol, such as diethylene glycol, as a diol component.

The polyethylene terephthalate of the present invention may be prepared by a known process such as an ester exchange process or a direct polymerization process using the terephthalic acid, if necessary, the isophthalic acid and the ethylene glycol and cyclohexanedimethanol.

The polyethylene terephthalate copolymer as mentioned above has an endothermic peak ranging from 180° to 240° C., preferably from 190° to 230° C., when measured by DSC (i.e., differential scanning calorimeter) after the copolymer is heated at 130° C. for 5 hours in nitrogen, and has an endotherm ranging from 10 to 40 Joule/g, preferably from 15 to 35 Joule/g, at the endothermic peak. When a polyethylene terephthalate copolymer is heated at 130° C. for 5 hours, the copolymer is well crystallized. In many cases, the endothermic peak of the polyethylene terephthalate copolymer according to the invention cannot be detected unless the copolymer is subjected to the above-mentioned heating. The aforementioned PETG is not crystallized even after it is heated at 130° C. for 5 hours, and therefore an endothermic peak cannot be detected. Polyethylene terephthalate copolymers having such characteristics that the endothermic peak is not detected even after heated under the above-mentioned conditions are insufficient in the odor-keeping properties and are poor in the heat resistance. On the other hand, polyethylene terephthalate copolymers having an endothermic peak temperature or an endotherm of higher than the upper limit of the above range or lower than the lower limit of the above range are reduced in ductility, resistance to stretching, impact strength, etc., when the copolymers are processed to form films. Accordingly, such copolymers are unsuitable for preparing inner layer materials of paper containers or inner coating materials of cans.

Ethylene copolymer ionomer

The ethylene copolymer ionomer used in the invention is an ionomer in which at least a part of carboxyl groups of an ethylene-unsaturated carboxylic acid copolymer is neutralized with a metallic cation.

The ethylene-unsaturated carboxylic acid copolymer constituting the ethylene copolymer ionomer used in the invention is a copolymer of ethylene and an unsaturated carboxylic acid. Employable as the unsaturated carboxylic acid are unsaturated carboxylic acids of 3–8 carbon atoms, and concrete examples thereof include acrylic acid, methacrylic acid, fumaric acid, itaconic acid, maleic anhydride, monomethyl maleate and monoethyl maleate. Of these, acrylic acid, methacrylic acid and maleic anhydride are particularly preferred.

The ethylene-unsaturated carboxylic acid copolymer used in the invention may contain other component as a third component in addition to ethylene and the unsaturated carboxylic acid. Employable as the third component are polar vinyl compounds having 3–12 carbon atoms or thereabout, and concrete examples thereof include esters of unsaturated carboxylic acids such as methyl acrylate, ethyl acrylate, i-butyl acrylate, n-butyl acrylate, 2-ethylhexyl acrylate and methyl methacrylate; and vinyl esters such as vinyl acetate.

In the ethylene-unsaturated carboxylic acid copolymer used in the invention, the content of ethylene is generally in the range of 60 to 99% by weight, preferably 70 to 99% by weight, and the content of the unsaturated carboxylic acid is generally in the range of 1 to 30% by weight, preferably 2 to 20% by weight.

In the case where the ethylene-unsaturated carboxylic acid copolymer contains the above-mentioned third component in addition to the ethylene component and the unsaturated carboxylic acid component, the content of the third component is generally at most 39% by weight, preferably at most 30% by weight.

The ionomer used in the invention is an ionomer in which at least a part of carboxyl groups contained in such ethylene-unsaturated carboxylic acid copolymer as mentioned above is neutralized with a metallic cation.

Examples of the metallic cations include monovalent to trivalent metallic cations such as $Na^+$, $K^+$, $Li^+$, $Ca^{2+}$, $Mg^{2+}$, $Zn^{2+}$, $Cu^{2+}$, $Co^{2+}$, $Ni^{2+}$, $Mn^{2+}$ and $Al^{3+}$. Of these, preferred are divalent ions such as $Zn^{2+}$ and $Mg^{2+}$. When an ionomer containing the divalent ions are used, the crystallization of the polyethylene terephthalate copolymer is not accelerated, and therefore a polyester composition free from change of heat-sealing properties with time and excellent in both the ductile properties and the impact resistance can be obtained.

Such ionomer as mentioned above can be obtained by copolymerizing ethylene and the unsaturated carboxylic acid ester (and the above-mentioned third component, if desired) to prepare an ethylene-unsaturated carboxylic acid ester copolymer and then neutralizing at least a part of carboxyl groups contained in the copolymer with a metallic ion, or by copolymerizing ethylene and the unsaturated carboxylic acid (and the above-mentioned third component, if desired) to prepare an ethylene-unsaturated carboxylic acid ester copolymer and then saponifying at least a part of an unsaturated carboxylic acid ester component contained in the copolymer.

In the invention, preferably employable is an ionomer obtained by copolymerizing ethylene and the unsaturated carboxylic acid (and the third component, if necessary) by a high-pressure radical polymerization to prepare a copolymer, using the copolymer as a base, and neutralizing a part or whole of the carboxyl groups contained in the copolymer. A degree of neutralization is generally in the range of 5 to 100%, preferably 10 to 90%. A melting point of the ionomer is generally in the range of 70° to 105° C. A melt flow rate (MFR) of the ionomer, as measured at 190° C. under a load of 2,160 g, is generally in the range of 0.01 to 1,000 dg/min, preferably 0.1 to 200 dg/min.

With respect to the amounts of the polyethylene terephthalate copolymer and the ionomer, the polyethylene terephthalate copolymer is used in an amount of 70 to 95 parts by weight, preferably 80 to 90 parts by weight, and the ionomer is used in an amount of 5 to 30 parts by weight, preferably 10 to 20 parts by weight, each based on 100 parts by weight of the total amounts of the polyethylene terephthalate copolymer and the ionomer. When the amount of the ionomer is too small, the obtained polyester composition is insufficient in the impact resistance and the extension properties, On the contrary, the amount of the ionomer is too large, the obtained polyester composition tends to be deteriorated in the heat resistance and the odor-keeping properties.

Ethylene polymer

The polyester composition for forming a polyester packaging material of the invention may contain a small amount of a non-polar ethylene polymer or a non-polar ethylene copolymer in addition to the above-mentioned polyethylene terephthalate copolymer and ethylene copolymer ionomer. When such polyester composition containing the ethylene polymer is used to prepare a polyester packaging material, the resulting polyester packaging material is excellent in the heat-sealing properties and the processing properties.

Examples of the ethylene polymers include homopolymers of ethylene and copolymers of ethylene and α-olefin having about 3-12 carbon atoms (e.g., propylene, 1-butene, 1-hexene and 4-methyl-1-pentene). Of these, particularly preferred is straight-chain low-density polyethylene.

The ethylene polymer is used in an amount of not more than 10 parts by weight, preferably 1 to 5 parts by weight, based on 100 parts by weight of the total amounts of the polyethylene terephthalate copolymer and the ionomer.

The polyester composition may contain additives such as an antioxidant. Especially when a hindered phenol type stabilizer (e.g., stabilizers under the trade names of Irganox 1010 and Irganox 1076) is added to the composition in an amount of about 0.05 to 1.0 part by weight, preferably about 0.2 to 1.0 part by weight, the composition can be prevented from yellowing and can be improved in the impact resistance. Further, in the case of using the composition for forming an inner layer of multi-layer packaging material or a layer of single-layer packaging material and conducting a heat-sealing treatment, the heat-sealing properties of the composition can be kept at a high level by virtue of adding the above additive.

The polyester packaging material of the invention has a layer formed from the polyester composition as a layer which is bought into direct contact with the content such as juice, soy sauce, detergent, oil and alcoholic beverage.

The layer formed from the polyester composition can be favorably used for an inner layer material of a paper container, a coating material of a metallic can, a hollow bottle, a tray, a lid material, etc. Further, the layer of the composition is laminated on other plastics or metallic foils, and the obtained laminate can be used as an inner layer of a multi-layer packaging material. Moreover, the layer of the composition can be used for a single-layer packaging material such as a bag-in-box type packaging material.

EFFECT OF THE INVENTION

The polyester packaging material has a layer formed from the above-mentioned polyester composition as an inner layer, and the material is excellent in various properties such as odor-keeping properties, heat resistance, ductile properties, impact resistance and heat-sealing properties. For example, when the polyester packaging material is used as an inner layer material of paper container, it shows excellent odor-keeping properties, high heat resistance and high heat-sealing properties. Further, when the polyester packaging material is used for a large capacity container, it shows high tear resistance. Accordingly, the polyester packaging material is very suitable for beverage containers. Moreover, in the case of using the polyester packaging material as an inner layer coating material of metallic can, a protective inner coat of high adhesion can be obtained by drawing or die coating, because the packaging material is excellent in the ductile properties. Furthermore, a container obtained by using the polyester packaging material is subjected to a heat sterlization treatment, the above-mentioned excellent properties can be maintained.

The packaging material of the invention is excellent particularly in the odor-keeping properties, so that it can be favorably used for packaging foods and drinks as described above. In addition, when the packaging material is used for packaging various odorous substances such as oily substance and detergent, the odor thereof hardly escapes outside or is hardly absorbed by the packaging material, and thereby the odor is hardly reduced.

Further, odor of the content contacting layer of the packaging material of the invention does not soak or transfer to the content, since the content contacting layer does not have odor.

EXAMPLE

Example 1

A polyethylene terephthalate copolymer was prepared by an ester exchange method using 97% by mol of terephthalic acid, 3% by mol of isophthalic acid (both: dicarboxylic acid components), 84% by mol of ethylene glycol and 16% by mol of 1,4-cyclohexanedimethanol (both: diol components). An endothermic peak of the polyethylene terephthalate copolymer was 199° C. when measured at a rate of temperature elevation of 10° C./min in a nitrogen atmosphere by means of DSC after heated at 130° C. for 5 hours in a nitrogen atmosphere, and an endotherm thereof at the endothermic peak was 29 Joule/g.

82% by weight of the above copolymer, 15% by weight of a Zn ionomer of an ethylene-methacrylic acid copolymer (content of methacrylic acid: 15% by weight, degree of neutralization with Zn: 60%) and 3% by weight of straight-chain low-density polyethylene (density: 0.920 g/cm$^3$, MFR: 20 dg/min) were independently dried sufficiently with heated nitrogen, and then they were kneaded together at 260° C. using a twin screw extruder (same screw rotation direction) of 44 mmφ. The extrudate was then granulated to prepare pellets of a polyester composition. In this kneading stage, to the composition was added Irganox 1010 (trade name, available from Ciba-Geigy, antioxidant) in an amount of 0.4 parts by weight per 100 parts by weight of the composition.

The obtained pellets of a polyester composition were dried again, and subjected to a film forming procedure using a cast film-forming machine at a resin temperature of 270° C., to obtain a film having a thickness of 40 μm.

The film was measured on the tensile stress and the elongation at break. The results are set forth in Table 1.

Further, the film was measured on the impact energy at break by means of a film impact tester (produced by Toyo Seiki K.K.). The result is set forth in Table 2.

Furthermore, the film was heat-sealed using a bar sealer (produced by Toyo Seiki K.K.), and thus treated film was measured on the peeling strength. The result is set forth in Table 3.

Moreover, the film was cut to give a strip film having a size of 3 cm ×3 cm. The strip film was immersed in a 100% liquid of d-limonene (odorous substance) and allowed to stand in a constant temperature bath of 23° C.

After predetermined periods of time, the film was taken out of the bath, and immediately the surface of the film was wiped with a filter paper. Then, the weight of the film was measured, and an increase of the weight thereof caused by absorption of limonene by the film was further measured. The results are set forth in Table 4. In Table 4 are also set forth results obtained by measuring low-density polyethylene (LDPE, density: 0.920 g/cm³, MFR: 1.6 dg/min) having a thickness of 40 μm in the same manner as described above.

Example 2

The procedure of Example 1 was repeated except for replacing the polyethylene terephthalate copolymer with a polyethylene terephthalate copolymer (endothermic peak measured at a rate of temperature elevation of 10° C./min in a nitrogen atmosphere by means of DSC after heated at 130° C. for 5 hours in a nitrogen atmosphere: 195° C., endotherm at the endothermic peak: 22 Joule/g) having been prepared from terephthalic acid (dicarboxylic acid component), 79% by mol of ethylene glycol and 21% by mol of 1,4-cyclohexanedimethanol (both: diol components), to prepare a film having a thickness of 40 μm.

The obtained film was measured on the tensile stress and the elongation at break. Further, other part of the same film was subjected to a retort treatment at 120° C. for 30 minutes in an autoclave. Thus treated film was measured on the tensile stress and the elongation at break. The results are set forth in Table 1.

Furthermore, the film was measured on the impact energy at break by means of a film impact tester, and the result is set forth in Table 2. Moreover, the film was measured on the heat-sealing strength and the increase of weight caused by absorption of limonene in the same manners as described above. The result on the heat-sealing strength is set forth in Table 3, and the result on the increase of weight by limonene absorption is set forth in Table 4.

Comparative Example 1

The procedure of Example 1 was repeated except for replacing the polyethylene terephthalate copolymer with a polyethylene terephthalate copolymer (endothermic peak measured at a rate of temperature elevation of 10° C./min in a nitrogen atmosphere by means of DSC after heated at 130° C. for 5 hours in a nitrogen atmosphere: 217° C., endotherm at the endothermic peak: 38 Joule/g) having been prepared from 86% by mol of terephthalic acid, 14% by mol of isophthalic acid (both: dicarboxylic acid components) and ethylene glycol (diol component), to prepare a film having a thickness of 40 μm.

The obtained film was measured on the tensile stress and the elongation at break before and after the above-mentioned retort treatment. The results are set forth in Table 1. Further, the film was measured on the impact energy at break by means of a film impact tester, and the result is set forth in Table 2.

Comparative Example 2

When pellets of a polyethylene terephthalate copolymer having been prepared from terephthalic acid (dicarboxylic acid component), 70% by mol of ethylene glycol and 30% by mol of 1,4-cyclohexanedimethanol (both: diol components) were heated at 130° C. for 5 hours in a nitrogen atmosphere, the pellets were strikingly blocked.

The block was partially cut to give a sample, and the sample was intended to measure an endothermic peak at a rate of temperature elevation of 10° C./min in a nitrogen atmosphere using DSC, but any endothermic peak was not detected and the polyethylene terephthalate copolymer was not crystallized.

The procedure of Example 1 was repeated except replacing the polyethylene terephthalate copolymer with the above-mentioned polyethylene terephthalate copolymer, to obtain a film having a thickness of 40 μm.

The film was subjected to the same retort treatment as described in Example 1. As a result, the film was markedly deformed after the treatment, and it has been confirmed that the film is impossible in the practical use as a packaging material for retort treatment.

Comparative Example 3

The d-limonene absorption test as described in Example 1 was conducted to a film composed of the polyethylene terephthalate copolymer of Comparative Example 2 prepared from terephthalic acid, 70% by mol of ethylene glycol and 30% by mol of 1,4-cyclohexanedimethanol.

The results are set forth in Table 4.

TABLE 1

(Tensile stress and elongation at break)

| | Blank | | | | After retort treatment | | | |
|---|---|---|---|---|---|---|---|---|
| | Tensile stress at break (MPa) | | Elongation at break (%) | | Tensile stress at break (MPa) | | Elongation at break (%) | |
| | lengthwise | crosswise | lengthwise | crosswise | lengthwise | crosswise | lengthwise | crosswise |
| Ex. 1 | 54 | 42 | 370 | 330 | — | — | — | — |
| Ex. 2 | 53 | 46 | 350 | 380 | 52 | 46 | 100 | 50 |
| Com. Ex. 1 | 57 | 47 | 430 | 0 | 62 | 50 | 0 | 0 |

Measuring conditions
tensile rate: 500 mm/min

TABLE 2

(Impact energy at break of film)

| | Impact energy (kg · cm/cm) |
|---|---|
| Example 1 | 2,000 |
| Example 2 | 2,300 |
| Comparative Example 1 | 700 |

Measuring conditions
impact plumb: 1 inchφ
full scale: 15 kg · cm

TABLE 3

(Heat-sealing strength of film)

| | Heat-sealing strength (N/15 mm) Heat-sealing temperature | | |
|---|---|---|---|
| | 130° C. | 150° C. | 170° C. |
| Example 1 | 17.0 | 20.0 | 22.0 |
| Example 2 | 16.5 | 19.5 | 22.0 |

Measuring conditions
heat-sealing conditions
sealing pressure: 0.2 MPa
sealing time: 0.7 sec
peeling conditions
peeling rate: 300 mm/min

TABLE 4
(Increase of film weight by d-limonene absorption)

| | Increase of weight (%) Immersion time | | |
|---|---|---|---|
| | 1 day | 7 days | 14 days |
| Example 1 | 0.1 | 0.3 | 0.3 |
| Example 2 | 0.2 | 0.4 | 0.7 |
| LDPE | 5.8 | 6.8 | 7.0 |
| Com. Ex. 3 | 0.4 | 3.0 | 7.9 |

As is evident from Table 1, Table 2, Table 3 and Table 4, the polyester packaging materials of the present invention were excellent in the film stretching property, impact strength of film at break and the heat-sealing property. Further, even after the retort treatment, the polyester packaging material not only showed somewhat stretching but also had high flexibility. Moreover, the polyester packaging materials of the invention hardly absorbed odor and were excellent in odor-keeping properties. Accordingly, it has been confirmed that the polyester packaging materials are very suitable for forming layers of packaging containers for odorous foods and drinks (e.g., paper container, plastic container, metallic can), the layers being brought into direct contact with foods and drinks.

Example 3

The procedure of Example 1 was repeated except for replacing the polyethylene terephthalate copolymer with a polyethylene terephthalate copolymer (endothermic peak measured at a rate of temperature elevation of 10° C./min in a nitrogen atmosphere by means of DSC after heated at 130° C. for 5 hours in a nitrogen atmosphere: 230° C., endotherm at the endothermic peak: 31 Joule/g) having been prepared from terephthalic acid (dicarboxylic acid component), 91% by mol of ethylene glycol and 9% by mol of 1,4-cyclohexanedimethanol (both: diol components), to prepare a film having a thickness of 40 μm.

The obtained film was measured on the tensile stress, the elongation at break, the impact energy at break by means of a film impact tester and the heat-sealing strength. The results are set forth in Table 5. Further, the film was measured on the increase of weight caused by d-limonene absorption in the same manner as described in Example 1, and the results are set forth in Table 6.

Example 4

A polyethylene terephthalate copolymer (endothermic peak measured at a rate of temperature elevation of 10° C./min in a nitrogen atmosphere by means of DSC after heated at 130° C. for 5 hours in a nitrogen atmosphere: 203° C., endotherm at the endothermic peak: 25 Joule/g) was prepared using 92% by mol of terephthalic acid, 8% by mol of isophthalic acid (both: dicarboxylic acid components), 88% by mol of ethylene glycol and 12% by mol of 1,4-cyclohexanedimethanol (both: diol components).

85% by weight of the above polyester terephthalate copolymer and 15% by weight of a Zn ionomer of an ethylene-methacrylic acid copolymer (content of methacrylic acid: 15% by weight, degree of neutralization with Zn: 60%) were melt-kneaded at 250° C. by means of a single-screw extruder of 65 mmφ (equipped with Dulmage type mixing section on the tip), and the extrudate was granulated to prepare pellets of a polyester composition. The pellets of a polyester composition were subjected to a cast film-forming procedure in the same manner as described in Example 1, to obtain a film having a thickness of 40 μm.

The obtained film was measured on the tensile stress, the elongation at break, the impact energy at break by means of a film impact tester and the heat-sealing strength. The results are set forth in Table 5. In this example, an antioxidant is not used, so that the heat-sealing strength of the film was lower than that of the films in Examples 1 to 3, although the film of this example showed heat-sealing properties. Further, the film was measured on the increase of weight caused by d-limonene absorption, and the results are set forth in Table 6.

TABLE 5

| | Example 3 | Example 4 |
|---|---|---|
| Tensile stress (MPa) | | |
| lengthwise | 55 | 46 |
| crosswise | 46 | 44 |
| Elongation at break (%) | | |
| lengthwise | 390 | 360 |
| crosswise | 400 | 370 |
| Impact energy at break (kg · cm/cm) | 3,300 | 1,600 |
| Heat-sealing strength (N/15 mm) | | |
| heating-sealing temperature: 130° C. | 17.8 | 0 |
| heating-sealing temperature: 150° C. | 21.3 | 7.5 |
| heating-sealing temperature: 170° C. | 23.5 | 13.2 |

TABLE 6
(Increase of film weight by d-limonene absorption)

| | Increase of weight (%) Immersion time | | |
|---|---|---|---|
| | 1 day | 7 days | 14 days |
| Example 3 | 0 | 0.2 | 0.4 |
| Example 4 | 0 | 0.2 | 0.2 |

Each of the films obtained in Examples 2 and 3 and Comparison Example 1 was allowed to stand for given periods of time at a temperature of 40° C. and a relative humidity of 75%, and then each of the films was heat-sealed at 170° C. under the conditions set forth in Table 3 to measure the heat-sealing strength (N/15 mm). The results are set forth in Table 7.

TABLE 7
(Heat-sealing strength after storage of long time, N/15 mm)

| | Example 2 | Example 3 | Com. Ex. 1 |
|---|---|---|---|
| Blank | 22.0 | 23.5 | 20.0 |
| After 2 weeks | 20.3 | 17.4 | 1.5 |
| After 1 month | 19.1 | 18.1 | 1.7 |
| After 2 months | 19.6 | 17.2 | 0 |

As is evident from Table 7, the polyester packaging materials of the present invention showed small reduction of heat-sealing properties even after stored for a long period of time at a high temperature and a high moisture. As a result, it has been confirmed that the polyester packaging materials of the invention are prominently suitable as packaging materials.

We claim:

1. A polyester packaging material having a layer formed from a polyester composition as a content contacting layer, wherein the polyester composition comprises:

70-95 parts by weight of a polyethylene terephthalate copolymer which is derived from terephthalic acid, ethylene glycol and cyclohexanedimethanol, a molar ratio of said ethylene glycol to said cyclohexanedimethanol being within the range of 95/5 to 75/25, and which has an endothermic peak of 180° to 240° C. as measured by a differential scanning calorimeter after heated at 130° C. for 5 hours in nitrogen and an endotherm of 10 and 40 Joule/g at the endothermic peak, and 5–30 parts by weight of an ethylene copolymer ionomer of an ethylene-unsaturated carboxylic acid copolymer having at least part of the carboxyl groups neutralized with a metallic cation.

2. The polyester packaging material as claimed in claim 1, wherein the polyester composition further contains a non-polar ethylene polymer or a non-polar ethylene copolymer in an amount of not more than 10 parts by weight based on 100 parts by weight of the total amounts of the polyethylene terephthalate copolymer and the ethylene copolymer ionomer.

3. The polyester packaging material as claimed in claim 2, wherein the non-polar ethylene polymer or the non-polar ethylene copolymer is straight-chain low-density polyethylene.

4. The polyester packaging material as claimed in claim 1, wherein the polyester composition contains an antioxidant in an amount of 0.05 to 1.0 part by weight based on 100 parts by weight of the polyester composition.

5. The polyester packaging material as claimed in claim 1, wherein the ethylene copolymer ionomer is a divalent metal ionomer.

6. The polyester packaging material as claimed in claim 1, wherein the polyethylene terephthalate copolymer is derived from said terephthalic acid, iosphthalic acid, said ethylene glycol and said cyclohexanedimethanol.

* * * * *